(12) United States Patent
Bicknell

(10) Patent No.: US 7,024,283 B2
(45) Date of Patent: Apr. 4, 2006

(54) METHOD OF DETERMINING INDOOR OR OUTDOOR TEMPERATURE LIMITS

(75) Inventor: Kirby N. Bicknell, Tyler, TX (US)

(73) Assignee: American Standard International Inc., New York, NY (US)

( * ) Notice: Subject to any disclaimer, the term of this patent is extended or adjusted under 35 U.S.C. 154(b) by 743 days.

(21) Appl. No.: 10/283,398

(22) Filed: Oct. 28, 2002

(65) Prior Publication Data

US 2004/0083029 A1  Apr. 29, 2004

(51) Int. Cl.
*G05B 11/00* (2006.01)
*G06F 19/00* (2006.01)

(52) U.S. Cl. .................. 700/276; 700/90; 165/200; 702/99

(58) Field of Classification Search .............. 700/90, 700/275, 276; 165/200; 702/99; 236/10; 62/132

See application file for complete search history.

(56) References Cited

U.S. PATENT DOCUMENTS

| | | | |
|---|---|---|---|
| 4,292,813 A | 10/1981 | Paddock | |
| 4,518,032 A * | 5/1985 | Funasaki et al. | 165/202 |
| 4,574,871 A | 3/1986 | Parkinson et al. | |
| 4,685,615 A | 8/1987 | Hart | |
| 5,276,630 A * | 1/1994 | Baldwin et al. | 700/276 |
| 5,647,533 A | 7/1997 | Schuster et al. | |
| 5,729,474 A | 3/1998 | Hildebrand et al. | |
| 6,868,293 B1 * | 3/2005 | Schurr et al. | 700/22 |

* cited by examiner

*Primary Examiner*—Jayprakash N. Gandhi
(74) *Attorney, Agent, or Firm*—William J. Beres; William O'Driscoll

(57) ABSTRACT

A method identifies at what outdoor temperature a heating or cooling system will need to operate at full capacity (e.g., 100% duty cycle) to maintain a desired indoor temperature. The tolerable outdoor temperature limit is identified by extrapolating data collected upon sampling the system's performance (e.g., duty cycle) at various loads (e.g., difference between outdoor temperature and the indoor temperature). In a similar manner, the method can also predict a best achievable indoor temperature for a given outdoor temperature. The tolerable outdoor temperature limit and best achievable indoor temperature can be displayed to indicate whether the system needs servicing.

59 Claims, 2 Drawing Sheets

METHOD OF DETERMINING INDOOR OR OUTDOOR TEMPERATURE LIMITS

BACKGROUND OF THE INVENTION

1. Field of the Invention

The present invention generally relates to heating, ventilating, and air conditioning systems (HVAC systems), and more specifically to a thermostat for such a system, wherein the thermostat identifies minimum or maximum tolerable outdoor temperatures for a given desired indoor temperature and/or identifies minimum or maximum achievable indoor temperatures for a given outdoor temperature.

2. Description of Related Art

Temperature conditioning equipment, such as gas or oil furnaces, electric heaters, air conditioners, and heat pumps are often used to control or modulate the temperature of a room or other area of a building. Although there are many ways of controlling such equipment, one common method involves cycling the equipment on and off as needed.

For example, the controller disclosed in U.S. Pat. No. 4,292,813 includes an off-time counter that determines the duration of the off cycle. The counter is incremented when the measured run-time of the equipment is less than a desired minimum and is decremented when the measured run-time is greater than a desired maximum. If the measured run-time is within a desired range, then the prior off-time is maintained.

As another example, U.S. Pat. No. 5,647,533 discloses a controller that varies the run-time of a heat pump. The speed of an indoor blower is adjusted whenever the operating run-time fraction of a heat cycle passes a predetermined threshold, unless the run-time fraction is sufficiently changed compared to a previous run-time fraction.

Regardless of the control scheme, many factors can reduce the heating or cooling effectiveness of temperature conditioning equipment. The equipment's heating or cooling effectiveness is a function of several factors, such as the equipment's designed capacity; the cleanliness of various heat exchangers and air filters; refrigerant charge; thermal load, which can vary with the outdoor temperature and the desired indoor temperature; and mechanical condition of a compressor or blower associated with the equipment.

To address diminished or otherwise insufficient capacity, some controllers include provisions for analyzing the condition of the equipment and its surroundings. For example, U.S. Pat. No. 4,574,871 discloses a diagnostic thermostat or monitor that measures run time for a heat pump compressor and compares expected run times for a particular outdoor temperature. An alarm signal identifies when the system fails to operate within expected parameters.

Another example of a diagnostic thermostat is disclosed in U.S. Pat. No. 4,685,615. Here, the thermostat senses the outdoor temperature and accumulates degree-days and run-time of a heating or cooling unit. The thermostat can calculate, store, and display energy used per degree-day for a given period to indicate the performance or efficiency of the building and its heating or cooling system.

U.S. Pat. No. 5,729,474 discloses another method of monitoring the effectiveness of a heating or cooling system. An efficiency value representing the system's ability to change temperature in a predetermined zone is repeatedly computed. Comparing a current efficiency value with a previous efficiency value helps identify deterioration of the system's ability to heat or cool. In response to a predetermined amount of deterioration, a control signal indicates a need for inspection of the system before the system fails completely.

However, a disadvantage of current thermostats is their inability to quantify certain operating limits of heating or cooling systems. For example, conventional thermostats fail to predetermine the maximum outdoor temperature that a particular cooling system can tolerate while still maintaining the indoor temperature at its desired level. And thermostats typically fail to predetermine the minimum or maximum achievable indoor temperature for a given outdoor temperature.

SUMMARY OF THE INVENTION

To overcome the drawbacks of current thermostats, it is an object of some embodiments of the invention to provide a method of determining a maximum or minimum tolerable outdoor temperature that a particular heating or cooling system can tolerate while still maintaining the indoor temperature at its desired level, wherein the method is based on sampling the system's performance at various loads.

Another object of some embodiments of the invention is to sample a system's performance at various loads to create data through which a straight or curved line can be fitted, whereby extrapolating along the line helps identify a maximum or minimum tolerable outdoor temperature.

Another object of some embodiments is to provide a method that helps determine a minimum or maximum achievable indoor temperature for a given outdoor temperature.

Another object of some embodiments is to compare a system's tolerable outdoor temperature limit to an optimum or otherwise specified temperature limit to determine whether the system needs servicing.

Yet, another object of some embodiments is to provide a user with feedback that indicates when a system may need servicing.

A further object of some embodiments is to provide a user with feedback that indicates a system's tolerable outdoor temperature limit for a given indoor temperature.

A still further object of some embodiments is to provide a user with feedback that indicates a system's best achievable indoor temperature limit for a given outdoor temperature.

These and other objects of the invention are provided by method of determining a tolerable outdoor temperature limit for a temperature conditioning apparatus. The method includes sampling the system's performance at various loads to create a set of data, and extrapolating the data to identify at what outdoor temperature the system will need to operate continuously to maintain a desired indoor temperature.

The present invention provides a method of determining a tolerable outdoor temperature limit for a temperature conditioning apparatus having a capacity that varies up to a maximum capacity. The method comprises determining a target indoor temperature; sensing an outdoor temperature; sensing an actual indoor temperature; repeatedly comparing the outdoor temperature to at least one of the actual indoor temperature and the target indoor temperature to determine a plurality of load values; and varying the capacity of the temperature conditioning apparatus to help maintain the actual indoor temperature within a predetermined range of the target indoor temperature. The method also comprises creating performance data by comparing the capacity to the plurality of load values; and extrapolating the performance data to the maximum capacity to predict the tolerable outdoor temperature limit at which the temperature conditioning apparatus is expected to be able to maintain the actual indoor temperature within the predetermined range of the target indoor temperature.

The present invention also provides a method of determining a tolerable outdoor temperature limit for a temperature conditioning apparatus. The method comprises determining a target indoor temperature; sensing an outdoor temperature; sensing an actual indoor temperature; repeatedly comparing the outdoor temperature to at least one of the actual indoor temperature and the target indoor temperature to determine a plurality of load values; and cycling the temperature conditioning apparatus on and off to create a plurality of on-times and plurality of off-times, whereby cycling the temperature conditioning apparatus helps maintain the actual indoor temperature within a predetermined range of the target indoor temperature. The method also comprises determining a plurality of duty cycles of the temperature conditioning apparatus by comparing the plurality of on-times to the plurality of off-times; creating performance data by comparing the plurality of duty cycles to the plurality of load values; and extrapolating the performance data to predict the tolerable outdoor temperature limit at which the temperature conditioning apparatus is expected to be able to maintain the actual indoor temperature within the predetermined range of the target indoor temperature.

The present invention further provides a method of determining a tolerable outdoor temperature limit for a temperature conditioning apparatus. The method comprises determining a target indoor temperature; sensing an outdoor temperature; sensing an actual indoor temperature; repeatedly comparing the outdoor temperature to at least one of the actual indoor temperature and the target indoor temperature to determine a plurality of load values. cycling the temperature conditioning apparatus on and off to create a plurality of on-times and plurality of off-times, whereby cycling the temperature conditioning apparatus helps maintain the actual indoor temperature within a predetermined range of the target indoor temperature. The method also comprises determining a plurality of duty cycles of the temperature conditioning apparatus by comparing the plurality of on-times to the plurality of off-times; creating performance data by comparing the plurality of duty cycles to the plurality of load values; based on the performance data, predicting the tolerable outdoor temperature limit at which the temperature conditioning apparatus is expected to be able to maintain the indoor temperature within the predetermined range of the target indoor temperature; establishing a specified temperature limit; comparing the tolerable outdoor temperature limit to the specified temperature limit, thereby creating a comparison; and displaying a signal that reflects the comparison.

The present invention still further provides a method of determining a tolerable outdoor temperature limit for a temperature conditioning apparatus. The method comprises determining a target indoor temperature; sensing an outdoor temperature; sensing an actual indoor temperature; repeatedly comparing the outdoor temperature to at least one of the actual indoor temperature and the target indoor temperature to determine a plurality of load values. cycling the temperature conditioning apparatus on and off to create a plurality of on-times and plurality of off-times, whereby cycling the temperature conditioning apparatus helps maintain the actual indoor temperature within a predetermined range of the target indoor temperature. The method also comprises determining a plurality of duty cycles of the temperature conditioning apparatus by comparing the plurality of on-times to the plurality of off-times; creating performance data by comparing the plurality of duty cycles to the plurality of load values; fitting a line through the performance data; extrapolating the performance data via the line to predict the tolerable outdoor temperature limit at which the temperature conditioning apparatus is expected to be able to maintain the actual indoor temperature within the predetermined range of the target indoor temperature; establishing a specified temperature limit; comparing the tolerable outdoor temperature limit to the specified temperature limit, thereby creating a comparison; and displaying a signal that reflects the comparison, wherein the signal indicates that the temperature conditioning apparatus may need servicing.

The present invention yet further provides a temperature conditioning apparatus having a capacity that varies up to a maximum capacity. The apparatus comprises components for determining a target indoor temperature; components for sensing an outdoor temperature; components for sensing an actual indoor temperature; and components for repeatedly comparing the outdoor temperature to at least one of the actual indoor temperature and the target indoor temperature to determine a plurality of load values. The apparatus also comprises components for varying the capacity of the temperature conditioning apparatus to help maintain the actual indoor temperature within a predetermined range of the target indoor temperature; components for creating performance data by comparing the capacity to the plurality of load values; and components for extrapolating the performance data to the maximum capacity to predict the tolerable outdoor temperature limit at which the temperature conditioning apparatus is expected to be able to maintain the actual indoor temperature within the predetermined range of the target indoor temperature.

The present invention moreover provides a temperature conditioning apparatus. The apparatus comprises a device for determining a target indoor temperature; a device for sensing an outdoor temperature; a device for sensing an actual indoor temperature; and a device for repeatedly comparing the outdoor temperature to at least one of the actual indoor temperature and the target indoor temperature to determine a plurality of load values. The apparatus further comprises a device for cycling the temperature conditioning apparatus on and off to create a plurality of on-times and plurality of off-times, whereby cycling the temperature conditioning apparatus helps maintain the actual indoor temperature within a predetermined range of the target indoor temperature. The apparatus also comprises a device for determining a plurality of duty cycles of the temperature conditioning apparatus by comparing the plurality of on-times to the plurality of off-times; a device for creating performance data by comparing the plurality of duty cycles to the plurality of load values; and a device for extrapolating the performance data to predict the tolerable outdoor temperature limit at which the temperature conditioning apparatus is expected to be able to maintain the actual indoor temperature within the predetermined range of the target indoor temperature.

DESCRIPTION OF THE PREFERRED EMBODIMENT

Figure 1:
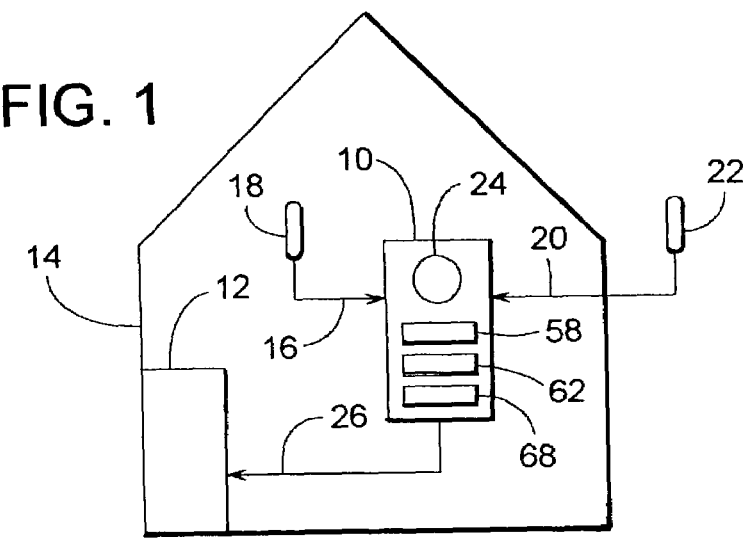
FIG. 1 is a schematic diagram of a thermostat and a heating or cooling system employing the subject invention.

Referring to FIG. 1, a thermostat 10 controls a temperature conditioning unit 12 for heating or cooling a room or area within a building 14. Unit 12 is schematically illustrated to represent any temperature conditioning apparatus, examples of which include, but are not limited to, a gas or oil furnace, electric heater, air conditioner, and heat pump.

Thermostat 10 is schematically illustrated to represent any system monitor or controller adapted to analyze input from a temperature sensor and provide certain feedback in response to the sensed temperature. Examples of thermostat 10 include, but are not limited to, an electronic thermostat, a computer, microprocessor, microcomputer, digital circuits, analog circuits, and various combinations thereof.

In some embodiments of the invention, thermostat 10 receives an input 16 from an indoor temperature sensor 18 and an input 20 from an outdoor temperature sensor 22. Sensor 18 senses the actual indoor temperature of building 14, and sensor 22 senses the building's outdoor temperature. Thermostat 10 also includes an input 24 that allows a user to select or establish a desired target indoor temperature. Input 24 is schematically illustrated to represent any user interface, such as a dial, push button, keyboard, touch screen, etc.

In response to inputs 16, 20 and 24, thermostat 10 provides an output signal 26 that varies the capacity of unit 12 to help maintain the actual indoor temperature within a predetermined range (e.g., a few degrees or less) of the desired target indoor temperature. This process is schematically illustrated in FIG. 1 to represent all methods of varying the heating or cooling capacity of a temperature conditioning apparatus. A few examples of such methods include, but are not limited to, varying the speed of a refrigerant compressor, cycling a refrigerant compressor between different stages (e.g., a first stage providing a first refrigerant flow rate and a second stage providing a second refrigerant flow rate), throttling or cycling a valve to vary the flow of refrigerant, throttling or cycling a valve to vary the flow rate of chilled water, etc. In one embodiment of the invention, output signal 26 cycles unit 12 on and off as needed to maintain the indoor temperature at or near the desired target indoor temperature. Various on/off control schemes are well known to those skilled in the art.

In addition to controlling unit 12, thermostat 10 can calculate the tolerable outdoor temperature limit (maximum for cooling systems, minimum for heating). The tolerable outdoor temperature is the outdoor temperature at which unit 12 would need to operate at its maximum capacity in order to maintain an actual indoor temperature at or near a given desired target indoor temperature. Thermostat 10 can also determine whether unit 12 needs servicing by comparing the calculated tolerable outdoor temperature limit to a predetermined specified outdoor temperature limit. In some embodiments, thermostat 10 can also determine the minimum or maximum achievable indoor temperature for a given outdoor temperature. To do all this (in the example of an on/off control scheme), thermostat 10 follows the control algorithm outlined in FIG. 2.

In control block 28, thermostat 10 reads the outdoor temperature through feedback 20 provided by sensor 22. In block 30, thermostat 10 reads the actual indoor temperature as sensed by temperature sensor 18. In block 32, a user provides thermostat 10 with a desired target indoor temperature. Block 34 comprises a conventional on/off control scheme that cycles unit 12 on and off to maintain the indoor temperature at or near the desired target indoor temperature. Generally, the greater the difference between the outdoor temperature and the target indoor temperature, the closer unit 12 must operate at its maximum capacity of 100% (numeral 35 in FIG. 3). For an on/off control scheme, the capacity of unit 12 is in terms of duty cycle (i.e., the percentage of time that unit 12 is running: (on-time)/(on-time+off-time)).

In blocks 36 and 38, thermostat 10 determines and periodically records (e.g., temporarily stores, remembers, etc.) the capacity or duty cycle at various operating conditions. The operating conditions may be described in terms of load values (e.g., the difference between the outdoor temperature and the target indoor temperature or the difference between the outdoor temperature and the actual indoor temperature). In blocks 40 and 42, thermostat 10 compares the various operating capacities or duty cycles to the load values to create performance data. The operations of blocks 40 and 42 are illustrated graphically in FIG. 3, wherein a Y-axis 44 represents load values (e.g., temperature differential between the outdoor temperature and the target indoor temperature), an X-axis 46 represents the capacity (e.g., duty cycle or percentage of on-time of unit 12), and data points 48 represent performance data plotted as load value versus capacity.

In blocks 50 and 52, a line, such as a curved line 54 or a straight line 56 can be fitted through data points 48. Line 54 or 56 can help in extrapolating data points 48 to predict the tolerable outdoor temperature limit at which unit 12 is expected to be able to maintain the actual indoor temperature within a predetermined range of the target indoor temperature (e.g., a predetermined range of just a few degrees). For instance, if unit 12 is used for cooling with a target indoor temperature of 70 degrees Fahrenheit, then the maximum tolerable outdoor temperature is 130 degrees (70°+60°, wherein 70° is the target temperature and 60° is the indoor/outdoor temperature differential when unit 12 is operating at its maximum capacity of a 100% duty cycle). Or, if unit 12 is used for heating with a target temperature of 70°, then the minimum tolerable outdoor temperature is 10° (70°−60°). Once determined, the tolerable outdoor temperature 58 can be displayed on thermostat 10, as shown in FIG. 1. Such a display can provide a user with an indication of how well unit 12 can handle future heating or cooling loads.

Figure 3:
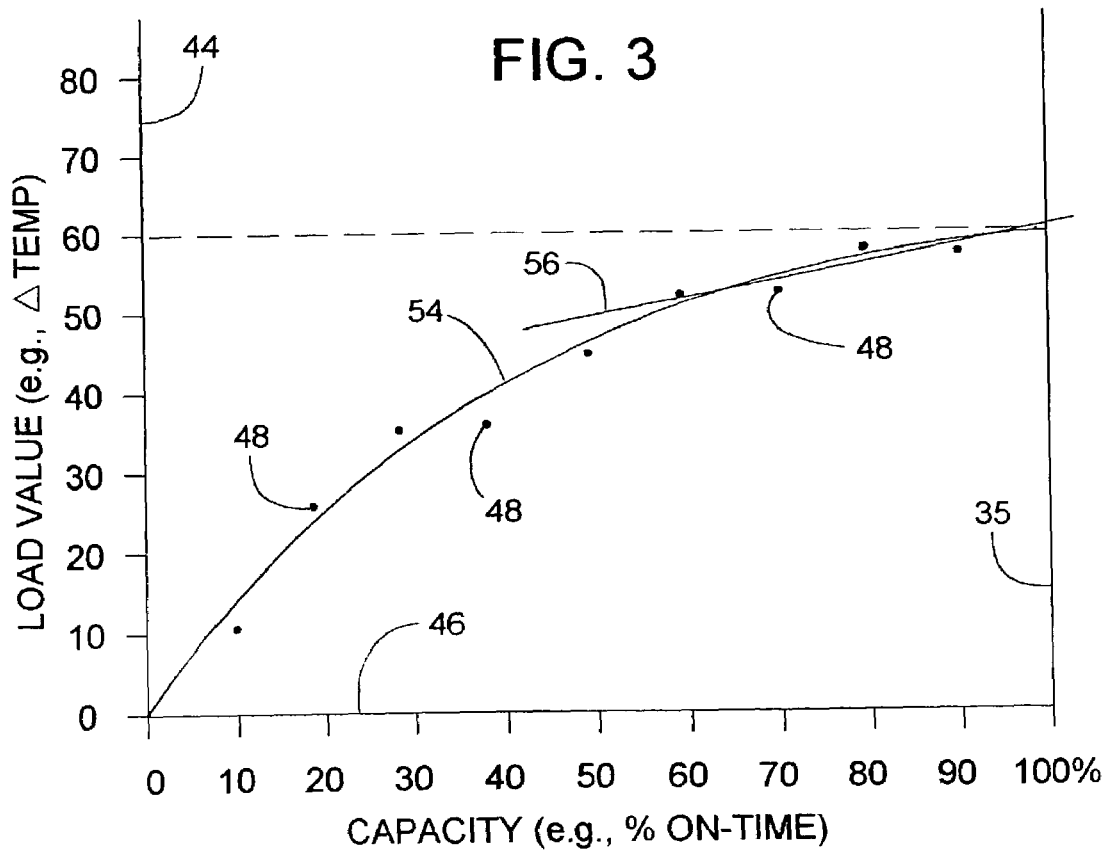
FIG. 3 is a graph illustrating one aspect of the invention.

It should be noted that the graph of FIG. 3 is just for illustration, and that the actual data points may lie in a much different arrangement, depending on the particular temperature conditioning unit and other factors. Although data points 48 are used for both cooling and heating examples, in reality, heating and cooling may generate completely different sets of data points. Moreover, the steps performed by blocks 36, 38, 40, 42 and 50 do not necessarily involve actually plotting data points 48 and physically drawing a line through the points. Rather, data points 48 can be stored as numbers or coordinates, and the step of fitting a line can be performed by deriving from points 48 an equation for a curved or straight line that when extrapolated can identify a tolerable outdoor temperature limit. Such a method of fitting a line (e.g., an equation) through a set of data points is common knowledge.

In block 60, thermostat 10 uses data points 48 to predict a best achievable indoor temperature for a given outdoor temperature. The expression, "best achievable indoor temperature" refers to the approximate expected indoor temperature that is farthest from the outdoor temperature, in the logical right direction of course. In a cooling mode, for example, if the outdoor temperature is 110°, and data points 48 indicate that at a maximum capacity or 100% duty cycle, system 12 can handle a load or indoor/outdoor temperature differential of 60°, then unit 12 should be able maintain an achievable indoor temperature of 50° (110°–60°). Using the same data points 48, in a heating mode with an outdoor temperature of 30°, unit 12 would be expected to be able to maintain an achievable indoor temperature of 90° (30°+60°). In FIG. 1, thermostat 10 displays an achievable indoor temperature 62 to provide a user with an indication of how much extra capacity (or lack thereof) unit 12 has at a particular load condition.

Block 64 illustrates the step of establishing a specified outdoor temperature limit, i.e., the tolerable outdoor temperature limit when unit 12 is new or in perfect condition. Such a limit is preferably set at the factory or by a service technician. When compared to the actual tolerable outdoor temperature limit, as performed by block 66, the specified outdoor temperature limit provides the user with an indication of whether the performance of unit 12 has deteriorated. If so, thermostat 10 may display a signal 68 that indicates that unit 12 may need servicing, as indicated by block 70. Signal 68 can be an on/off light or a written message.

Figure 2:
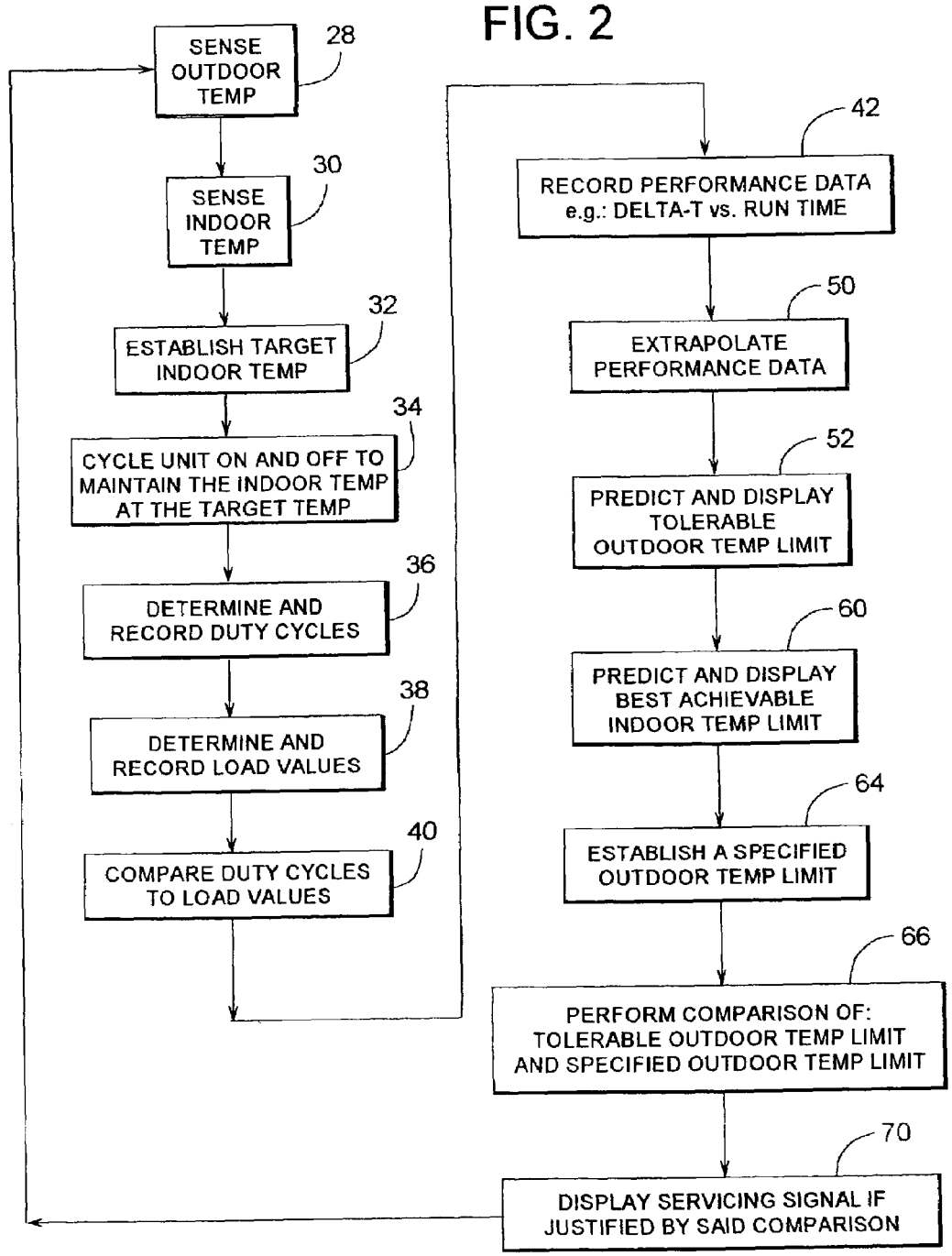
FIG. 2 is a flow chart that outlines a method according to one embodiment of the invention.

The arrows interconnecting the blocks of FIG. 2 are there to indicate that the algorithm process is repeated and ongoing.

Although the invention is described with reference to a preferred embodiment, it should be appreciated by those skilled in the art that other variations are well within the scope of the invention. For example, rather than sensing temperature, other conditions such as indoor air quality, carbon dioxide level, carbon monoxide level, humidity, pressure or the like may be sensed in accordance with the invention. Therefore, the scope of the invention is to be determined by reference to the claims, which follow.

I claim:

1. A method of determining a tolerable outdoor temperature limit for a temperature conditioning apparatus having a capacity that varies up to a maximum capacity, comprising:
   determining a target indoor temperature;
   sensing an outdoor temperature;
   sensing an actual indoor temperature;
   repeatedly comparing the outdoor temperature to at least one of the actual indoor temperature and the target indoor temperature to determine a plurality of load values;
   varying the capacity of the temperature conditioning apparatus to help maintain the actual indoor temperature within a predetermined range of the target indoor temperature;
   creating performance data by comparing the capacity to the plurality of load values; and
   extrapolating the performance data to the maximum capacity to predict the tolerable outdoor temperature limit at which the temperature conditioning apparatus is expected to be able to maintain the actual indoor temperature within the predetermined range of the target indoor temperature.

2. The method of claim 1, wherein the step of varying the capacity is performed by cycling the temperature conditioning apparatus on and off to create a plurality of on-times and plurality of off-times.

3. The method of claim 2, further comprising determining a plurality of duty cycles of the temperature conditioning apparatus by comparing the plurality of on-times to the plurality of off-times.

4. The method of claim 3, wherein the step of creating performance data is performed by comparing the plurality of duty cycles to the plurality of load values.

5. The method of claim 1, wherein the temperature conditioning apparatus is a cooling apparatus.

6. The method of claim 1, wherein the temperature conditioning apparatus is a heating apparatus.

7. The method of claim 1, further comprising fitting a straight line through the performance data.

8. The method of claim 1, further comprising fitting a curved line through the performance data.

9. The method of claim 1, further comprising:
   establishing a specified temperature limit; and
   comparing the tolerable outdoor temperature limit to the specified temperature limit, thereby creating a comparison.

10. The method of claim 6, displaying a signal that reflects the comparison.

11. The method of claim 10, wherein the signal indicates that the temperature conditioning apparatus may need servicing.

12. The method of claim 1, further comprising displaying the tolerable outdoor temperature limit.

13. The method of claim 1, further comprising predicting a best achievable indoor temperature based on the performance data and the outdoor temperature.

14. The method of claim 13, further comprising displaying the best achievable indoor temperature.

15. A method of determining a tolerable outdoor temperature limit for a temperature conditioning apparatus, comprising:
   determining a target indoor temperature;
   sensing an outdoor temperature;
   sensing an actual indoor temperature;
   repeatedly comparing the outdoor temperature to at least one of the actual indoor temperature and the target indoor temperature to determine a plurality of load values;
   cycling the temperature conditioning apparatus on and off to create a plurality of on-times and plurality of off-times, whereby cycling the temperature conditioning apparatus helps maintain the actual indoor temperature within a predetermined range of the target indoor temperature;
   determining a plurality of duty cycles of the temperature conditioning apparatus by comparing the plurality of on-times to the plurality of off-times;
   creating performance data by comparing the plurality of duty cycles to the plurality of load values; and
   extrapolating the performance data to predict the tolerable outdoor temperature limit at which the temperature conditioning apparatus is expected to be able to maintain the actual indoor temperature within the predetermined range of the target indoor temperature.

16. The method of claim 15, wherein the temperature conditioning apparatus is a cooling apparatus.

17. The method of claim 15, wherein the temperature conditioning apparatus is a heating apparatus.

18. The method of claim 15, further comprising fitting a straight line through the performance data.

19. The method of claim 15, further comprising fitting a curved line through the performance data.

20. The method of claim 15, further comprising:
   establishing a specified temperature limit; and
   comparing the tolerable outdoor temperature limit to the specified temperature limit, thereby creating a comparison.

21. The method of claim 20, displaying a signal that reflects the comparison.

22. The method of claim 21, wherein the signal indicates that the temperature conditioning apparatus may need servicing.

23. The method of claim 15, further comprising displaying the tolerable outdoor temperature limit.

24. The method of claim 15, further comprising predicting a best achievable indoor temperature based on the performance data and the outdoor temperature.

25. The method of claim 24, further comprising displaying the best achievable indoor temperature.

26. A method of determining a tolerable outdoor temperature limit for a temperature conditioning apparatus, comprising:
   determining a target indoor temperature;
   sensing an outdoor temperature;
   sensing an actual indoor temperature;
   repeatedly comparing the outdoor temperature to at least one of the actual indoor temperature and the target indoor temperature to determine a plurality of load values;
   cycling the temperature conditioning apparatus on and off to create a plurality of on-times and plurality of off-times, whereby cycling the temperature conditioning apparatus helps maintain the actual indoor temperature within a predetermined range of the target indoor temperature;
   determining a plurality of duty cycles of the temperature conditioning apparatus by comparing the plurality of on-times to the plurality of off-times;
   creating performance data by comparing the plurality of duty cycles to the plurality of load values;
   based on the performance data, predicting the tolerable outdoor temperature limit at which the temperature conditioning apparatus is expected to be able to maintain the indoor temperature within the predetermined range of the target indoor temperature;
   establishing a specified temperature limit;
   comparing the tolerable outdoor temperature limit to the specified temperature limit, thereby creating a comparison; and
   displaying a signal that reflects the comparison.

27. The method of claim 26, wherein the temperature conditioning apparatus is a cooling apparatus.

28. The method of claim 26, wherein the temperature conditioning apparatus is a heating apparatus.

29. The method of claim 26, further comprising fitting a straight line through the performance data.

30. The method of claim 26, further comprising fitting a curved line through the performance data.

31. The method of claim 26, wherein the signal indicates that the temperature conditioning apparatus may need servicing.

32. The method of claim 26, further comprising displaying the tolerable outdoor temperature limit.

33. The method of claim 26, further comprising predicting a best achievable indoor temperature based on the performance data and the outdoor temperature.

34. The method of claim 33, further comprising displaying the best achievable indoor temperature.

35. A method of determining a tolerable outdoor temperature limit for a temperature conditioning apparatus, comprising:
   determining a target indoor temperature;
   sensing an outdoor temperature;
   sensing an actual indoor temperature;
   repeatedly comparing the outdoor temperature to at least one of the actual indoor temperature and the target indoor temperature to determine a plurality of load values;
   cycling the temperature conditioning apparatus on and off to create a plurality of on-times and plurality of off-times, whereby cycling the temperature conditioning apparatus helps maintain the actual indoor temperature within a predetermined range of the target indoor temperature;
   determining a plurality of duty cycles of the temperature conditioning apparatus by comparing the plurality of on-times to the plurality of off-times;
   creating performance data by comparing the plurality of duty cycles to the plurality of load values;
   fitting a line through the performance data;
   extrapolating the performance data via the line to predict the tolerable outdoor temperature limit at which the temperature conditioning apparatus is expected to be able to maintain the actual indoor temperature within the predetermined range of the target indoor temperature;
   establishing a specified temperature limit;
   comparing the tolerable outdoor temperature limit to the specified temperature limit, thereby creating a comparison; and
   displaying a signal that reflects the comparison, wherein the signal indicates that the temperature conditioning apparatus may need servicing.

36. The method of claim 35, wherein the temperature conditioning apparatus is a cooling apparatus.

37. The method of claim 35, wherein the temperature conditioning apparatus is a heating apparatus.

38. The method of claim 35, wherein the line is a straight line.

39. The method of claim 35, wherein the line is a curved line.

40. The method of claim 35, further comprising displaying the tolerable outdoor temperature limit.

41. The method of claim 35, further comprising predicting a best achievable indoor temperature based on the performance data and the outdoor temperature.

42. The method of claim 41, further comprising displaying the best achievable indoor temperature.

43. A method of determining a tolerable outdoor limit for a conditioning apparatus having a capacity that varies up to a maximum capacity, comprising:
   determining a target indoor condition;
   sensing an outdoor condition;
   sensing an actual indoor condition;
   repeatedly comparing the outdoor condition to at least one of the actual indoor condition and the target indoor condition to determine a plurality of load values;
   varying the capacity of the conditioning apparatus to help maintain the actual indoor condition within a predetermined range of the target indoor condition;
   creating performance data by comparing the capacity to the plurality of load values; and
   extrapolating the performance data to the maximum capacity to predict the tolerable outdoor condition limit at which the conditioning apparatus is expected to be able to maintain the actual indoor condition within the predetermined range of the target indoor condition.

44. The method of claim 43, wherein the step of varying the capacity is performed by cycling the conditioning apparatus on and off to create a plurality of on-times and plurality of off-times.

45. The method of claim 44, further comprising determining a plurality of duty cycles of the conditioning apparatus by comparing the plurality of on-times to the plurality of off-times.

46. The method of claim 45, wherein the step of creating performance data is performed by comparing the plurality of duty cycles to the plurality of load values.

47. The method of claim 43, wherein the conditioning apparatus is a temperature cooling apparatus.

48. The method of claim 43, wherein the conditioning apparatus is a temperature heating apparatus.

49. A temperature conditioning apparatus having a capacity that varies up to a maximum capacity, comprising:
 means for determining a target indoor temperature;
 means for sensing an outdoor temperature;
 means for sensing an actual indoor temperature;
 means for repeatedly comparing the outdoor temperature to at least one of the actual indoor temperature and the target indoor temperature to determine a plurality of load values;
 means for varying the capacity of the temperature conditioning apparatus to help maintain the actual indoor temperature within a predetermined range of the target indoor temperature;
 means for creating performance data by comparing the capacity to the plurality of load values; and
 means for extrapolating the performance data to the maximum capacity to predict the tolerable outdoor temperature limit at which the temperature conditioning apparatus is expected to be able to maintain the actual indoor temperature within the predetermined range of the target indoor temperature.

50. The apparatus of claim 49, wherein the step of varying the capacity further includes means for cycling the temperature conditioning apparatus on and off to create a plurality of on-times and plurality of off-times.

51. The apparatus of claim 50, further comprising means for determining a plurality of duty cycles of the temperature conditioning apparatus by comparing the plurality of on-times to the plurality of off-times.

52. The apparatus of claim 51, wherein the step of creating performance data includes means for comparing the plurality of duty cycles to the plurality of load values.

53. The apparatus of claim 49, further comprising:
 means for establishing a specified temperature limit; and
 means for comparing the tolerable outdoor temperature limit to the specified temperature limit, thereby creating a comparison.

54. A temperature conditioning apparatus, comprising:
 means for determining a target indoor temperature;
 means for sensing an outdoor temperature;
 means for sensing an actual indoor temperature;
 means for repeatedly comparing the outdoor temperature to at least one of the actual indoor temperature and the target indoor temperature to determine a plurality of load values;
 means for cycling the temperature conditioning apparatus on and off to create a plurality of on-times and plurality of off-times, whereby cycling the temperature conditioning apparatus helps maintain the actual indoor temperature within a predetermined range of the target indoor temperature;
 means for determining a plurality of duty cycles of the temperature conditioning apparatus by comparing the plurality of on-times to the plurality of off-times;
 means for creating performance data by comparing the plurality of duty cycles to the plurality of load values; and
 means for extrapolating the performance data to predict the tolerable outdoor temperature limit at which the temperature conditioning apparatus is expected to be able to maintain the actual indoor temperature within the predetermined range of the target indoor temperature.

55. The apparatus of claim 54, further comprising:
 means for establishing a specified temperature limit; and
 means for comparing the tolerable outdoor temperature limit to the specified temperature limit, thereby creating a comparison.

56. The apparatus of claim 55 further including means for, displaying a signal that reflects the comparison.

57. The apparatus of claim 56, wherein the signal indicates that the temperature conditioning apparatus may need servicing.

58. The apparatus of claim 54, further comprising means for displaying the tolerable outdoor temperature limit.

59. The apparatus of claim 54, further comprising means for predicting a best achievable indoor temperature based on the performance data and the outdoor temperature.

* * * * *